(12) United States Patent
Hendzel

(10) Patent No.: US 6,412,844 B1
(45) Date of Patent: Jul. 2, 2002

(54) ROBOTIC GRIPPER MECHANISM

(75) Inventor: Louis J. Hendzel, Owego, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/483,731

(22) Filed: Jan. 14, 2000

(51) Int. Cl.$^7$ .............................. B25J 15/08; B25J 19/06
(52) U.S. Cl. ..................... 294/67.31; 294/68.3; 294/88; 294/113; 294/907; 901/39; 901/49
(58) Field of Search ........................... 294/67.31, 67.32, 294/67.3, 81.51, 82.3, 82.31, 82.34, 68.3, 86.4, 88, 93, 97, 106, 110.1, 902, 907, 113; 414/618, 626, 730, 739, 753.1; 901/30–39, 49, 50

(56) References Cited

U.S. PATENT DOCUMENTS

| | | | | |
|---|---|---|---|---|
| 1,451,324 A | * | 4/1923 | Casamayor | 294/82.34 |
| 1,693,074 A | * | 11/1928 | Falco | 294/67.31 |
| 3,086,808 A | * | 4/1963 | Kaplan | 294/67.31 |
| 3,307,871 A | * | 3/1967 | Russell et al. | 294/97 X |
| 4,576,407 A | * | 3/1986 | Lambert | 294/97 |
| 4,639,184 A | * | 1/1987 | Knasel et al. | 901/49 X |
| 4,648,771 A | * | 3/1987 | Yoshioka | 294/106 X |
| 4,702,667 A | * | 10/1987 | Hounsfield et al. | 901/49 X |
| 5,184,860 A | * | 2/1993 | Bouillon et al. | 294/67.31 |
| 5,338,150 A | * | 8/1994 | Focke et al. | 294/67.31 X |
| 5,470,189 A | * | 11/1995 | Baumann et al. | 294/68.3 X |

FOREIGN PATENT DOCUMENTS

| | | | | |
|---|---|---|---|---|
| SU | 719852 | * | 3/1980 | 901/50 |
| SU | 1691262 | * | 11/1991 | 294/113 |

* cited by examiner

*Primary Examiner*—Johnny D. Cherry
(74) *Attorney, Agent, or Firm*—Wolf, Greenfield & Sacks, P.C.

(57) ABSTRACT

The invention provides a robotic gripper mechanism having a thin, protrusion-free profile for maneuvering through tight areas, which mechanism includes a finger assembly mounted at the distal end of a gripper arm, which arm extends from a movable housing. The finger assembly is normally biased to a retracted position, but may be moved to an extended operative position by a drive member operating on a slide in the arm through suitable intermediary components. The invention also includes a mechanism for permitting retraction of the arm when an obstacle is encountered during vertical downward movement of the gripper mechanism so as to protect the arm and the finger assembly from damage.

21 Claims, 7 Drawing Sheets

ROBOTIC GRIPPER MECHANISM

This invention relates to robotic devices and more particularly to a robotic gripper for use in picking up, transporting and dropping selected objects, particularly where the gripper must pass through tight areas to reach the object.

BACKGROUND OF THE INVENTION

There are many applications in industry, government, (for example the post office), and other businesses or institutions where robotic mechanisms are used to lift and carry selected objects, for example containers for various items, from one place to another. Frequently, the areas of operation for such robotic mechanisms are very tight and require a mechanism having a thin profile, free of protrusions, in order for the robotic gripper mechanism to be maneuvered into a suitable position to perform the gripping and lifting operation. A simple, inexpensive mechanism capable of performing the gripper function, while still having a thin, protrusion-free profile for maneuvering through tight areas, does not currently exist.

Another problem for robotic gripper mechanisms when operating in tight areas is that, even with a thin profile, the mechanism may still strike an object when being lowered into a pickup position. Since the gripper mechanisms are frequently being moved at relatively high speed to achieve good throughput rate, such inadvertent striking of an obstruction in a mechanism path may cause significant damage to the gripper mechanism, resulting in a costly shutdown of the entire system in which it is being utilized, and may also damage the object providing the obstruction. It is therefore desirable that a simple and inexpensive mechanism be provided to protect the gripper mechanism and prevent damage thereto in the event an obstruction is inadvertently encountered when the gripper mechanism is being lowered into an operative position. Again, a such simple and inexpensive protection mechanism does not currently exist.

SUMMARY OF THE INVENTION

In accordance with the above, this invention provides a robotic gripper mechanism which includes a housing, a gripper arm extending from said housing, a finger assembly mounted at a distal end of the arm, the finger assembly being normally biased to a retracted position, a slide moveable in the arm between a first inoperative position relative to the finger assembly and a second operative position, a drive member having at least a first and second state, and components operated by the drive member and operating on the slide in response to the state of the drive member such that the slide is in its first operative position when the drive member is in its first state and the slide is in its second operative position when the drive member is in its second state, the slide not influencing the position of the finger assembly when in its first position and acting on the finger assembly to move it to an extended operative position when the slide is in its second position.

The finger assembly may include at least one finger sized and shaped to, when the assembly is in its extended position, either fit under an object to be lifted, to fit in a corresponding receptacle in a side of the object, and/or to fit into a receptacle extending from the top of the object. The finger assembly may also be sized and shaped to fit through an opening form in the top of the object to be lifted when the assembly is in the retracted position and to grip the top of the object for lifting of the object when the assembly is moved to its operative position after passing through the opening. The finger assembly may also be movable, against its normal bias, when the slide moves from its second to its first position and there is weight on the finger assembly from an object being lifted, to a position where the object is released. Once the object is released, removing weight from the finger, the finger assembly operates under its bias to return to its retracted position.

The components between the drive member and the slide may be a mechanical linkage which mechanically attaches the drive member to the slide, the drive member preferably being a pneumatic cylinder. The finger assembly is preferably rotated about a pivot between its retracted and extended position, the mechanism preferably including a bias spring acting on the finger assembly to normally maintain it in its retracted position. At least one component may be provided which facilitates tension adjustment on the spring, and thus the bias force applied to the finger assembly.

The components between the drive member and slide may alternatively include a pivot arm and a mechanical linkage between the drive member and the pivot arm, the linkage pivoting the pivot arm out of contact with the slide when the drive member is in its first state and pivoting the pivot arm to bear against the slide in a manner to move and hold the slide in its second position when the drive member is in the second state. A biasing mechanism may be provided which moves the slide to its first inoperative position when the pivot arm is out of contact therewith.

The housing, including the gripper arm, may be positionable, at least vertically, to bring the gripper arm into position to perform a gripping operation and a mechanism may be provided which permits retraction of the gripper arm to protect the gripper arm when, during a downward vertical positioning of the housing, an obstacle is encountered by the gripper arm. The mechanism which permits retraction may include a mechanism for frictionally maintaining a vertical position for the gripper arm, friction applied to the gripper arm by such mechanism being sufficiently low that the gripper arm may overcome the friction and move up relative to the housing when an obstacle is encountered. The mechanism may also include an element for selectively removing the friction from the gripper arm when the arm is in a raised position, permitting the gripper arm to return to its normal position relative to the housing, and for then restoring frictional engagement with the arm. Alternatively, gravity alone may maintain the vertical position of the gripper arm, facilitating easy movement of the arm when an obstacle is encountered. A detector may be provided which indicates the position of the gripper arm relative to the housing. While the mechanism which permits retraction is preferably used in conjunction with the alternative component embodiment, it may also be utilized with other embodiments of the invention.

In accordance with another aspect of the invention, a robotic gripper mechanism is provided which includes the housing, the gripper arm extending from the housing and the finger assembly mounted at the distal end of the arm. The housing, including the gripper arm and finger assembly, are positionable, at least vertically, to bring the gripper arm into position to perform a gripper operation, and a mechanism is provided which permits retraction of the gripper arm to protect the arm and the finger assembly when, during a downward vertical positioning of the housing, an obstacle is encountered by the gripper arm. The mechanism which permits retraction may include a mechanism for frictionally maintaining a vertical position of the gripper arm with a friction sufficiently low that the gripper arm may overcome the friction and move up relative to the housing when an obstacle is encountered and an element may be provided for selectively removing the friction from the gripper arm when the arm is in a raised position, permitting the gripper arm to return to its normal position relative to the housing, and for then restoring frictional engagement of the arm. A detector may also be provided which indicates the position of the gripper arm relative to the housing. The foregoing and other objects, features and advantages of the invention will be apparent from the following more particular description of preferred embodiments of the invention as illustrated in the accompanying drawings, the same or related reference numerals being utilized for common elements in the various figures.

IN THE DRAWINGS

DETAILED DESCRIPTION

Figure 1:
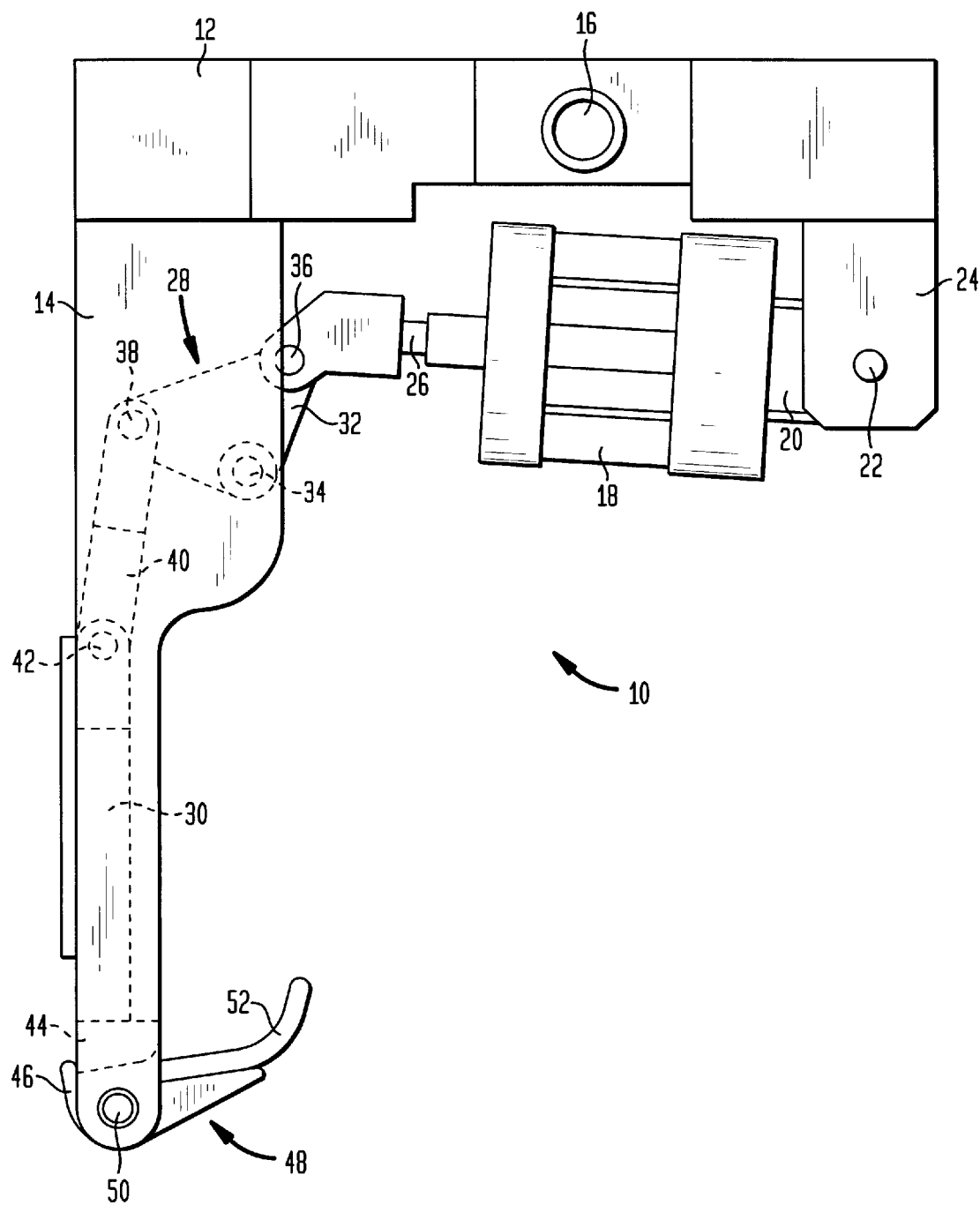
FIG. 1 is a side view of a gripper mechanism in accordance with a first embodiment of the invention, shown in its operative position.

Referring first to FIG. 1, a gripper mechanism 10 is shown having a housing 12 with an extending arm 14. Housing 12 is mounted, for example by a bolt 16, to a suitable robotic positioning system, which system is preferably capable of moving in three dimensions to position mechanism 10 over an object to be lifted, to maneuver arm 14 into position to grip the object in manners to be described later, and to lift and reposition the object once it is gripped. The specifics of such robotic positioning systems are not part of this invention and any suitable robotic positioning system, either currently existing or developed in the future, may be utilized for performing the positioning function. A pneumatic cylinder 18 is provided having a projection 20 connected by a pin 22 to a pair of projections 24 from housing 12 (only one of which projections 24 is shown in the figures). A rod 26 extending from the opposite side of piston 18 is connected through a linkage mechanism 28 to a slide 30 in arm 14. Linkage mechanism 28 includes a bell crank 32 fixed at one corner by a pin 34 to arm 14 to rotate therein. The other two corners of bell crank 32 are connected by a pin 36 to an extension of piston rod 26 and by a pin 38 to a linkage 40 connected by a pin 42 to slide 30. Slide 30 has a toe 44 which bears against a carrier 46 of a finger assembly 48 rotatably mounted by a pin 50 to the distal end of arm 14. Finger assembly 48 also includes at least one projecting finger 52 mounted on carrier 46. Referring to FIG. 3c, it is seen that for preferred embodiments, a torsion spring 54 is wrapped around shaft 50 and supported at its end by locking spring retainers 56L and 56R. The tension on spring 54 may be adjusted by loosening set screw 58 and appropriately rotating retainer 56L. As will be discussed in greater detail later, torsion spring 54 normally biases finger assembly 48 to the retracted position shown in FIG. 2a. However, the tension on this spring is sufficiently low to permit a drop operation as described hereinafter in conjunction with FIG. 2c.

Figure 2A:
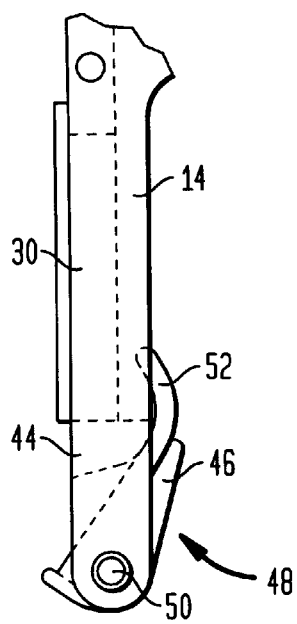
FIGS. 2a–2c are side views of all or part of the mechanism shown in FIG. 1 in its retracted or home position, extended or pick up position, and drop position respectively.

In operation, finger assembly 48, under the influence of spring 54, is normally in the retracted position shown in FIG. 2a. In this position, arm 14 has a relatively small footprint or profile and may therefore be easily maneuvered through relatively tight places in order to reach a desired location where gripping is desired. To achieve the position shown in FIG. 2a, piston 18 is retracted, causing rod 26 to pull back on pin 36. This pivots bell crank 32 in the clockwise direction, resulting in pin 38 being raised. The raising of pin 38 causes link 40 to move upward, resulting in an upward movement of slide 30 to the position shown in FIG. 2a, with foot 44 substantially out of contact with finger assembly 48, and particularly carrier 46 thereof.

Once arm 14 has been positioned with finger assembly 48 adjacent the object to be gripped, piston 18 may be operated to extend rod 26. Rod 26 being extended causes rocker arm 32 to rotate about pin 34 in the counterclockwise direction, thereby moving pin 38, link 40 and slide 30 in the downward direction. This causes foot 44 to bear against finger carrier 46 as shown in FIG. 1. This rotates the finger assembly 48 in the clockwise direction, as viewed in the Figures, about shaft 50 to extend finger 52 as shown in FIGS. 1 and 2b, and to hold finger 52 in this position. Once a finger is extended as shown in FIG. 2b, the finger may be maneuvered into, for example, a slot 60 in the side of, for example, a mail carrier basket 62. The length and shape of finger 52 (or fingers 52 as will be discussed later) depends on the specific application, and in particular what is being lifted and where it is being gripped. For example, if the object 62 being lifted has relatively straight side walls, it may be possible to have substantially straight fingers 52, which are perhaps slightly longer than those shown, which fingers are wedged under the object on opposite sides to lift the object. This may be facilitated by having the object on legs so the finger(s) may more easily fit thereunder. Further, a looped extension 64, or preferably a plurality of such looped extensions, may be provided on the top of object 62 into which fingers 52 of two or more robotic arms 14 are maneuvered in order to perform a pickup and moving operation. Another option is for there to be two or more holes in the top of object 62 which are big enough for the distal end of arm 14 to pass through when the finger assembly is in the retracted state shown in FIG. 2a, but small enough so that when the mechanism is operated to its extended position shown in FIG. 2b, finger 52 engages the underside of the lid of object 62 so as to lift the lid and the object secured thereto. The objects to be lifted may be provided with openings or other suitable receptacles on their top, sides or bottom in various applications so as to permit a suitably shaped finger 52 to interact with the object for purposes of gripping and lifting the object.

Once the object has been moved to its desired location, piston 18 may be operated to retract rod 26, rotating bell crank 32 in the clockwise direction to raise slide 30 so that foot 44 is no longer in contact with finger carrier 46. If there is no weight on the finger when this occurs, for example the finger has been lowered or moved slightly backward, then finger assembly 48 will retract to the position shown in FIG. 2a, permitting arm 14 to be raised and moved away from object 62. However, if object 62 is still being supported by finger 52 when slide 30 is retracted, the weight of the object will cause the finger assembly to move to the drop position shown in FIG. 2c, the object dropping from the gripper mechanism when the finger(s) are in this position. Alternatively, when the object is resting on the ground when slide 30 is retracted, the finger will remain in the position shown in FIG. 2*b* until arm 14 is moved upward, at which time the finger assembly will be moved by the object to the position shown in FIG. 2*c* to permit fingers 52 to be removed from and ultimately clear object 62. Once the tip of finger 52 clears object 62, the finger assembly will be retracted to the position shown in FIG. 2*a*.

Figure 2C:
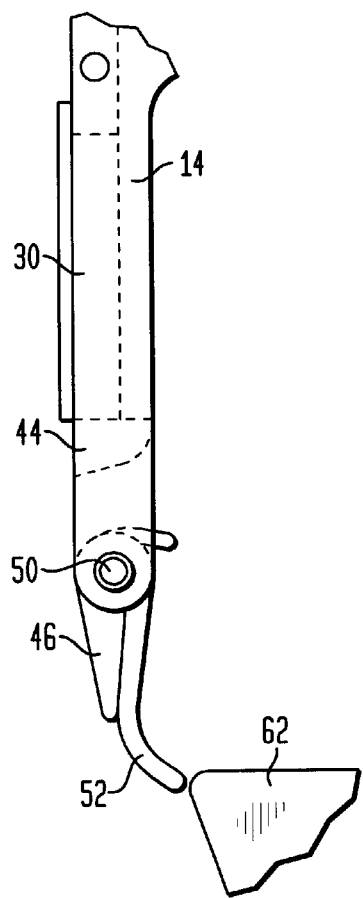
Figure 2B:
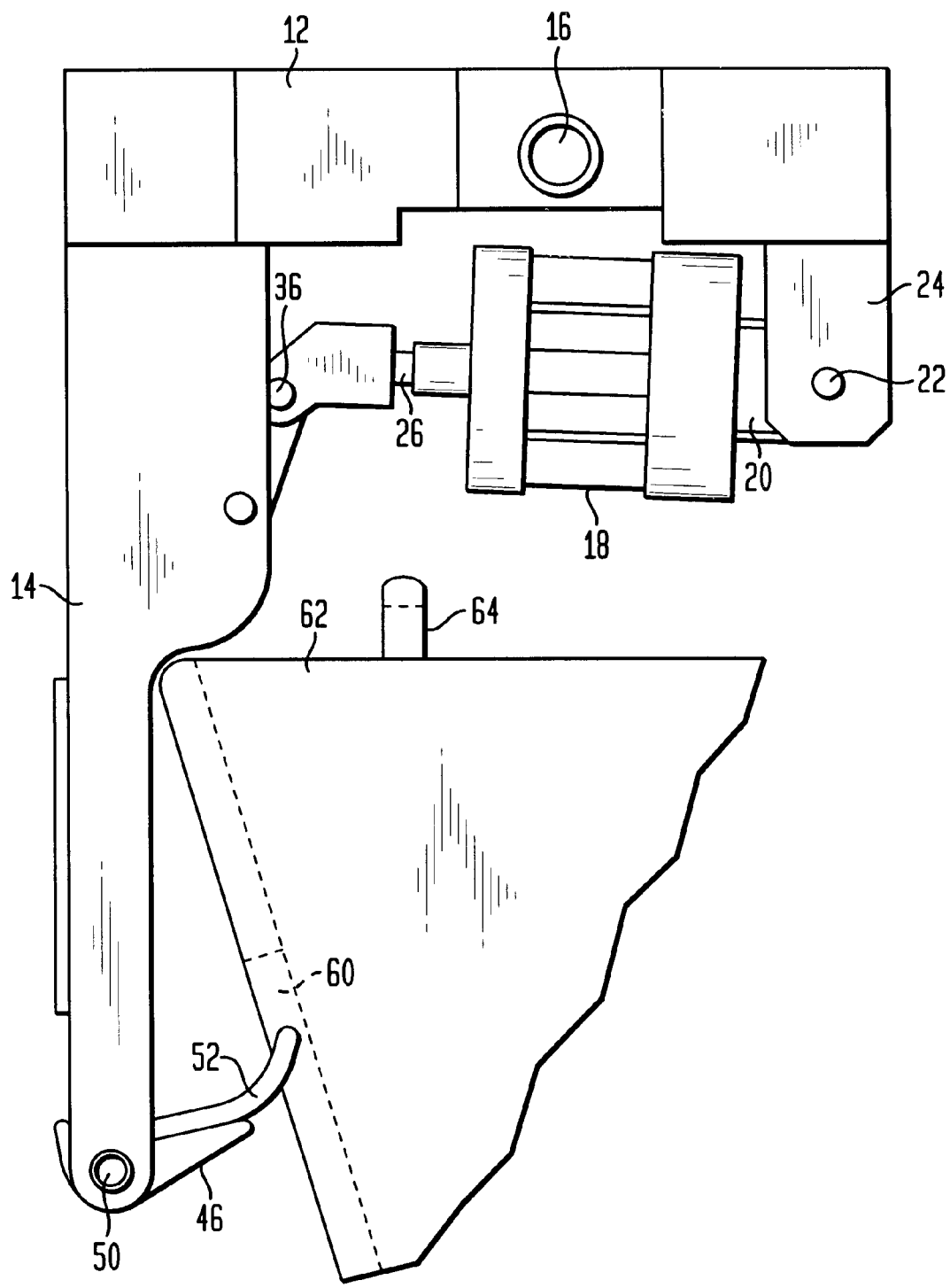
Figure 3A:
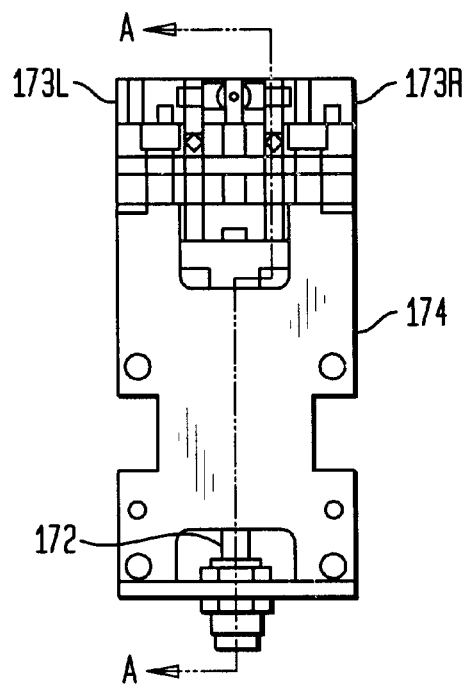
FIGS. 3a and 3b are a top view and a front view respectively of a gripper mechanism in accordance with a second embodiment of the invention.
Figure 3B:
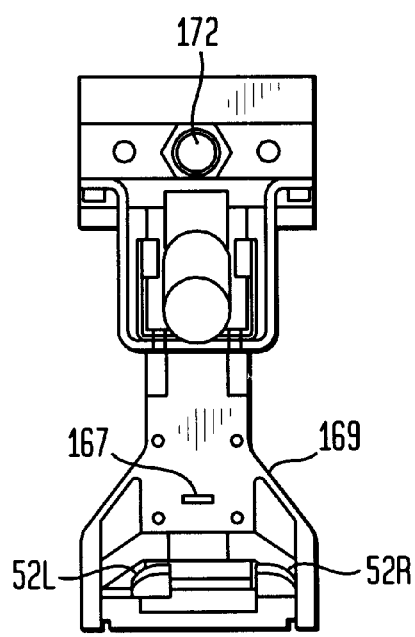
Figure 3C:
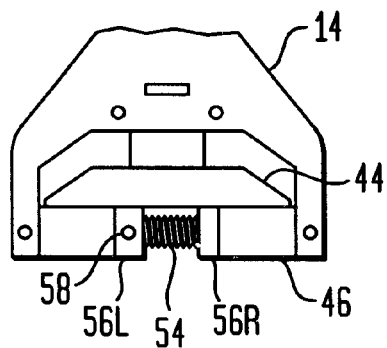
FIG. 3c is a partial rear view of primarily the finger assembly for the embodiment of FIGS. 3a and 3b (and also for the embodiment of FIG. 1).
Figure 3E:
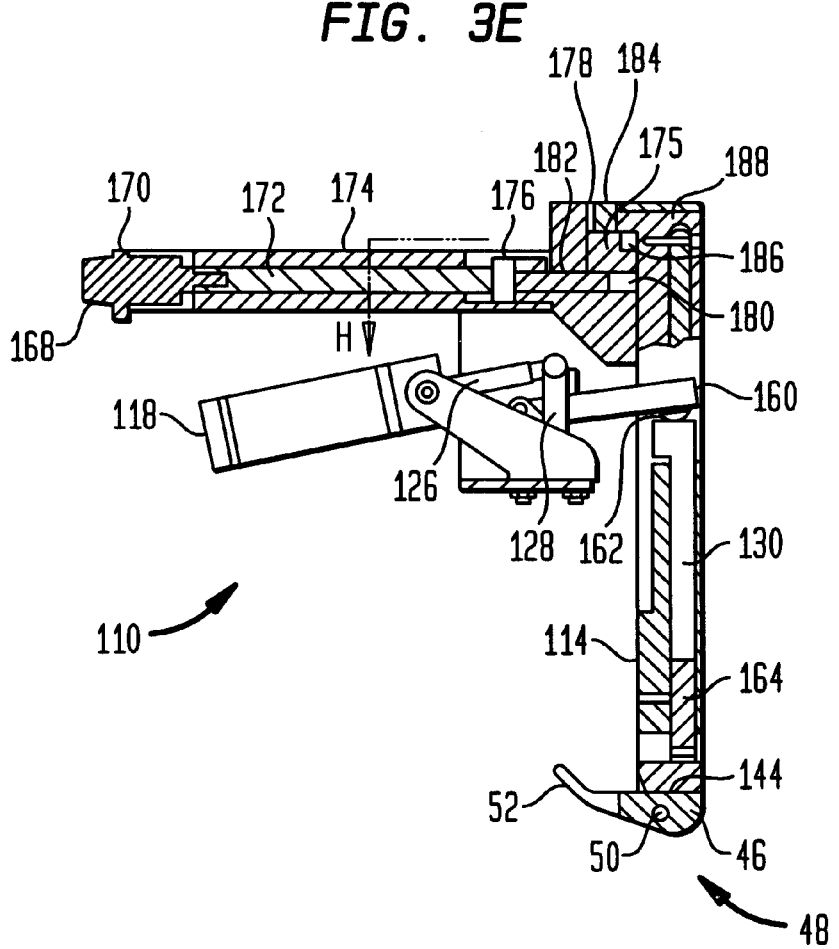
FIGS. 3e and 3f are sectional views for the embodiment shown in FIGS. 3a and 3b, shown in an operative position and in a retracted position respectively.
Figure 3D:
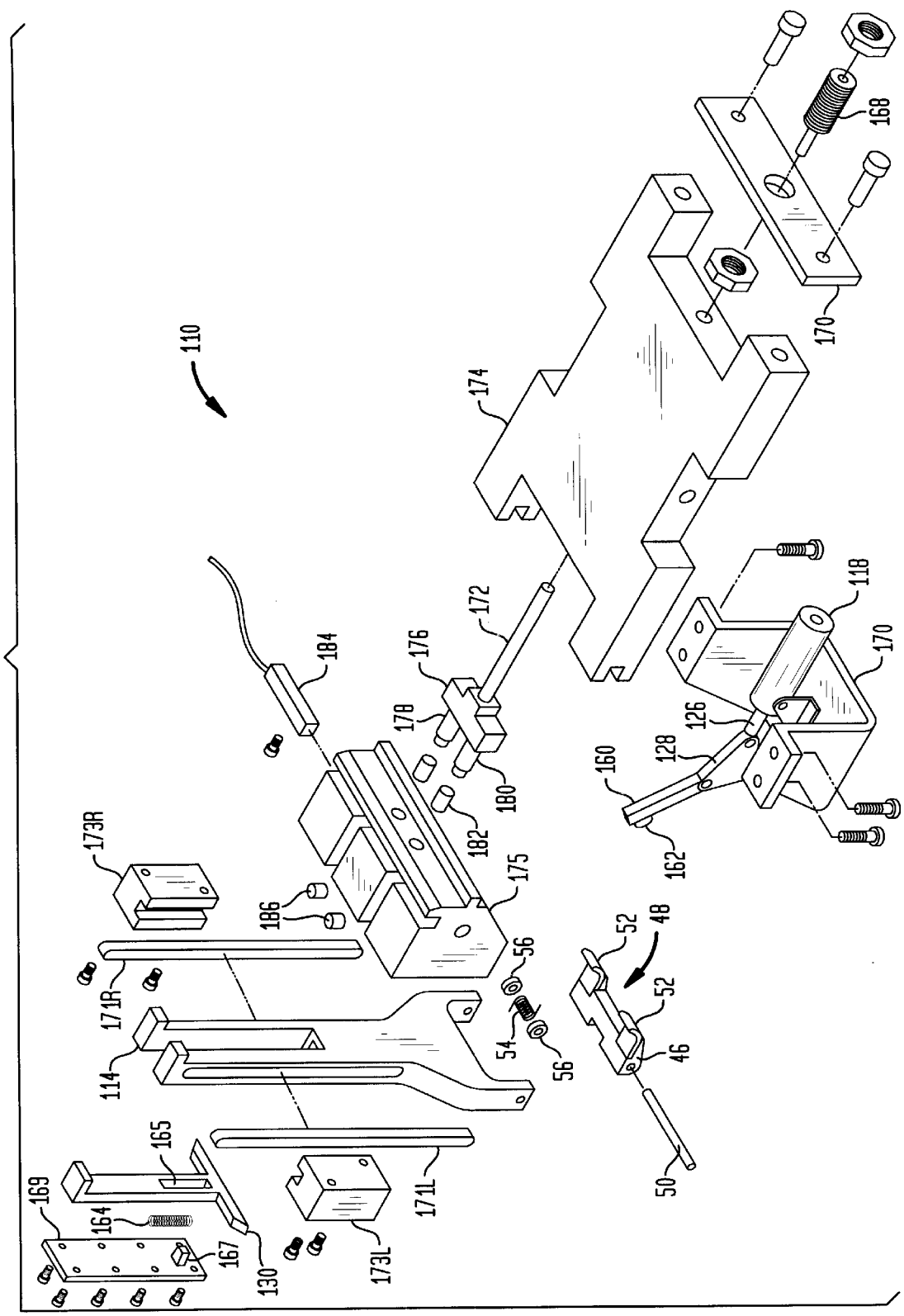
FIG. 3d is an exploded view for the embodiment of FIGS. 3a and 3b.
Figure 3F:
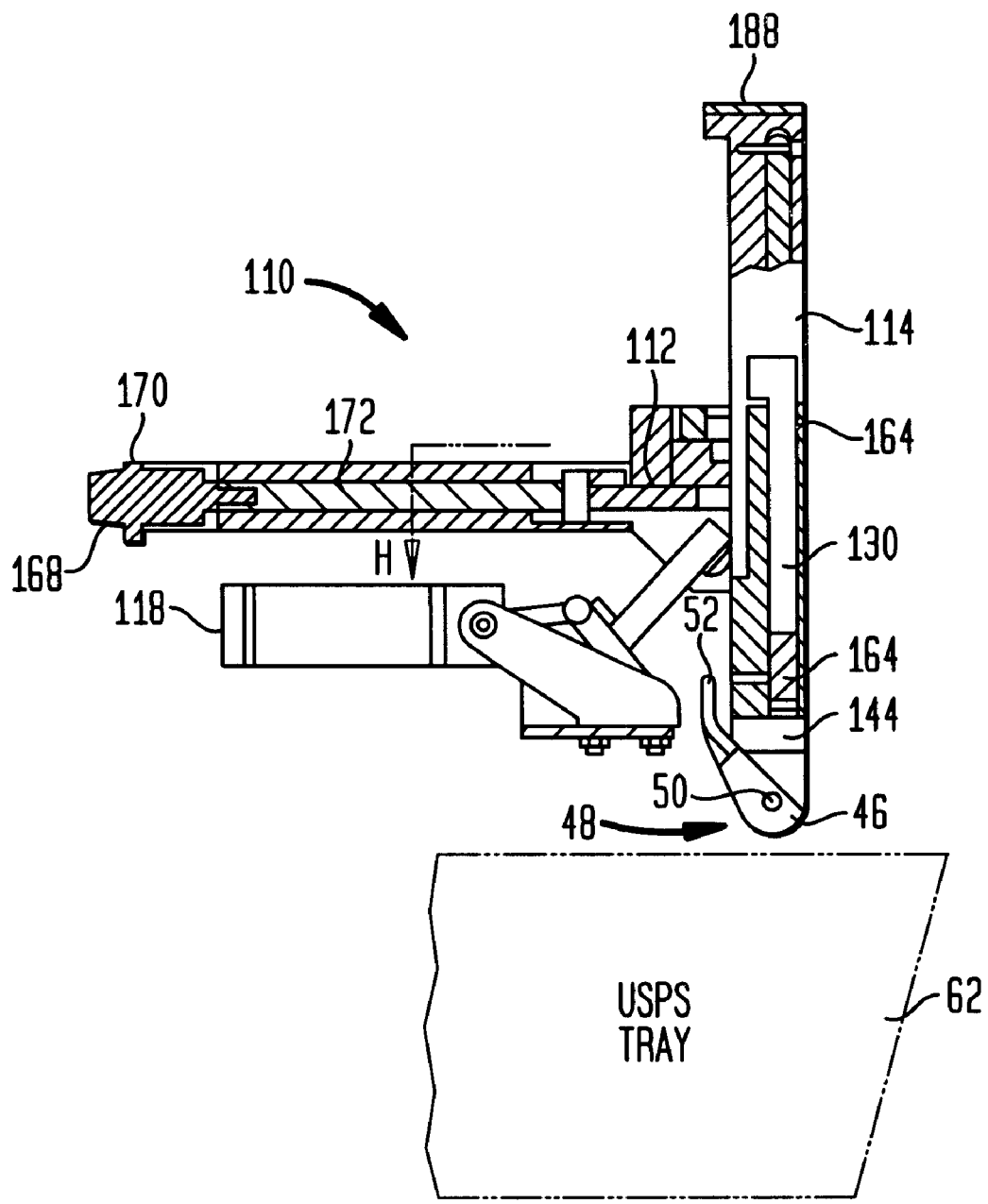

FIGS. 3*a*–3*f* illustrate an alternative embodiment of the invention which differs from the embodiment shown in FIGS. 1 and 2 in two respects. First, the manner in which the pneumatic cylinder is linked to operate the slide is different. The second difference, which is facilitated by the first, is that arm 114 is retractable in order to prevent damage to the mechanism 110, and in particular to the finger assembly 46 of this mechanism, in the event, when the mechanism is being lowered into position to grab an object, the mechanism encounters an obstacle. More particularly, piston rod 126 from piston 118 is connected through a mechanical linkage 128 to a pivot arm 160 having a button 162 at the distal end thereof. Referring to FIG. 3*f*, when the piston 118 is in its inactive or retracted position, arm 160 is pivoted away from arm 114 permitting slide 130 to be raised in arm 114 to the position shown in FIG. 3*f* under the influence of a coil spring 164 or other suitable biasing component. Spring 164 fits in an opening 165 formed in slide 130, the top of the spring pressing on the upper wall of opening 165 and the bottom of the spring contacting a shelf 167 extending into opening 165 from rear plate 169. Rear plate 169 is attached by screws or other suitable means to arm 114. This raising of slide 130 permits finger assembly 48 to be biased to its retracted position as shown in FIG. 3*f*. If there were a weight on finger(s) 52 when slide 130 was moved to its retracted position, the finger assembly would move to the position shown in FIG. 2*c* to permit the weight to be shed, before returning to the retracted position shown.

Referring to FIG. 3*e*, when it is desired to move slide 130 to its downward active position, pneumatic cylinder 118 is operated to extend its piston 126. Piston 126 operates through linkage 128 to rotate pivot arm 160 in the clockwise direction as viewed in FIG. 3*e*, bringing button 162 at the distal end thereof into contact with the top of slide 130, and moving slide 130 into its operative position shown in FIG. 3*e* as arm 160 continues to pivot to its final position. With slide 130 in its lowered active position, foot 144 operates on carrier 46 as previously discussed to move and hold finger assembly 48 in its extended position. The foot 144 is preferably unitary with slide 130 as shown, but may be a separate component fixed in suitable manner to the slide.

Protection of the arm assembly is achieved by having rails 171L, 171R on opposite sides of arm 114 which are vertically slidable respectively in slots of left and right slide caps 173L, 173R fixed to and extending from opposite slides of block 175, the arm sliding from a normal operative position as shown in FIG. 3*e* to a retracted position as shown for example in FIG. 3*f* when an obstacle is encountered. A pneumatic cylinder 168 is provided which is mounted in a bracket 170 and has a rod attached to a shaft 172 extending through a portion 174 of the housing. Shaft 172 ends in a block 176 having a pair of shafts 178 extending therefrom, each terminating in a Teflon (synthetic resin polymer)-tipped nipple 180. Tips 180 may also be of other low friction material. A spring 182 on each shaft 178 bears against slide block 175 to retract block 176, and thus move nipples 180 out of engagement with arm 114, when cylinder 168 is released/retracted. A sensor 184 is provided which indicates when arm 114 is in the normal position shown in FIG. 3*e* and a bumper 186 is provided which both controls the position of arm 114 when it is in operative position shown in FIG. 3*e* and cushions the return of the arm to this position.

In operation, pneumatic cylinder 168 is normally operated to extend its piston to force the nipples 180 against arm 114 to hold the arm in the position shown in FIG. 3*e*. So long as an obstacle is not encountered during a downward motion of arm 114, the apparatus remains in this position. During a downward motion of the arm 114, in order to provide as small a profile as possible, piston 118 would normally be retracted to pivot arm 160 and button 162 at the distal end thereof out of contact with slide 130, and to the position shown in FIG. 3*f*, so as to no longer be over slide 130. If at any time during a downward motion of arm 114, an obstacle is encountered, the pressure or force applied by such obstacle to the bottom of finger assembly 48 is sufficient to overcome the low friction engagement of nipples 180 with arm 114, so that the arm may move upward under that force, preventing any damage to the arm and the finger assembly at the distal end thereof. Pivot arm 160, being pivoted away from arm 114 at this time, does not interfere with such upward movement. The fact that the arm has been moved upward as a result of encountering an obstruction is detected by detector 184.

Detector 184 detecting the upward movement of arm 114, projecting head 188 of arm 114 no longer being detected as being adjacent to detector 184, causes a suitable robotic control to lift the entire mechanism, including arm 114, to be clear of the obstruction. Once this is accomplished, pneumatic piston 168 is released. The release of pressure on piston 168 may either pull back on arm 172 to release the pressure applied to arm 114, or this may be accomplished by the piston merely relieving the force applied to arm 172 and the retraction of this arm and the nipples 180 affixed thereto being accomplished under control of compression springs 182. In either event, the deactivation of piston 168 results in nipples 180 no longer applying pressure to arm 114, permitting the arm to fall under the influence of gravity to its normal position shown in FIG. 3*e*, cushions 186 operating on projections 188 to cushion and damp this fall and to control the final position of the arm. Once detector 184 detects that arm 114 has returned to its normal position, pneumatic cylinder 168 is again operated to press nipples 180 against arm 114 to hold the arm in that position.

While in the discussion above a piston 168 has been provided which normally presses low friction nipples 180 against arm 114 to maintain the vertical position thereof, this is not a limitation on the invention and, for some embodiments, it may be preferable to either dispense with the entire mechanism for applying holding pressure to the arm 114, including pneumatic cylinder 168 and all of the components between this cylinder and nipples 180 or to only operate this mechanism under selected conditions such as when the gripper fingers have engaged an object to be moved. In this case, gravity would normally be relied upon to hold arm 114 in its desired operative position and the arm could be easily moved to avoid damaging contact with an obstruction when the arm is being lowered or to permit the arm to move over an obstruction as the arm follows a more complicated travel path. Frictional engagement should normally not be required even when an object is being moved by the arm since the weight of the object should only be sufficient to maintain the arm in its operative position.

Fingers 52 may be a single finger of a length and shape appropriate for the application, or may be two or more fingers, two fingers 52L and 52R being shown for an illustrative embodiment in FIG. 3b. Further, while pneumatic cylinders are used as the drive mechanism for the preferred embodiments shown, other suitable drive elements, including hydraulic cylinders, solenoids, servomotors and the like, may be utilized as the drive elements in place of the pneumatic cylinders. In addition, while two different coupling mechanisms have been shown between the drive mechanism and the slide, these are also by way of illustration only, and other suitable coupling mechanisms may be utilized, depending on application and other factors. Other details of construction may also vary with application. It should also be noted that, while only a single gripper mechanism 10, 110 is shown in the figures, typically at least two such mechanisms, and sometimes more, operating for example on opposite sides of the object 62, would generally be required to lift the object. Thus, while the invention has been particularly shown and described above with reference to preferred embodiments, the foregoing and other changes in form and detail made therein by one skilled in the art while still remaining within the spirit and scope of the invention, which is to be defined only by the appended claims.

What is claimed is:

1. A robotic gripper mechanism including:

a housing;

a gripper arm extending from said housing;

a finger assembly mounted at a distal end of said arm, said assembly being normally biased to a retracted position;

a slide movable in said arm between a first inoperative position relative to said finger assembly and a second operative position;

a drive member having at least a first and a second state; and components operated by said drive member and operating on said slide in response to the state of said drive member such that said slide is in said first inoperative position when said drive member is in its first state and in its second operative position when said drive member is in its second state, said slide not influencing the position of said finger assembly when in its first position, and acting on said finger assembly to push it to an extended, operative position when the slide moves from its first to its second position and, to hold the finger assembly in its operative position.

2. A mechanism as claimed in claim 1 wherein said finger assembly has at least one finger sized and shaped to, when the assembly is in its extended position, at least one of fit under an object to be lifted, fit in a corresponding receptacle in a side of the object, and fit into a receptacle extending from the top of the object.

3. A mechanism as claimed in claim 1 wherein said finger assembly is sized and shaped to fit through an opening formed in a top of an object to be lifted when the assembly is in the retracted position, and to grip the top of the object for lifting of the object when the assembly is moved to its operative position after passing through said opening.

4. A mechanism as claimed in claim 1 wherein said finger assembly is movable, against its normal bias, when said slide moves from its second to its first position and there is weight on the finger assembly, to a position where the object is released.

5. A mechanism as claimed in claim 1 wherein said components mechanically attach said drive member and said slide, said components being a mechanical linkage.

6. A mechanism as claimed in claim 1 wherein said drive member is a pneumatic cylinder.

7. A mechanism as claimed in claim 1 wherein said finger assembly is rotated about a pivot between said retracted and extended positions, and including a bias spring acting on said assembly to normally maintain it in said retracted position.

8. A mechanism as claimed in claim 7 including at least one component which facilitates tension adjustment said spring, and thus bias force applied to said finger assembly.

9. A mechanism as claimed in claim 1 wherein said components include a pivot arm, and a mechanical linkage between said drive member and said pivot arm, said linkage pivoting said pivot arm out of contact with said slide when the drive member is in its first state and pivoting said pivot arm to bear against said slide in a manner to move and hold the slide in its second, operative position when the drive member is in its second state.

10. A mechanism as claimed in claim 9 including a biasing mechanism which moves the slide to its first inoperative position when said pivot arm is out of contact therewith.

11. A mechanism as claimed in claim 9 wherein said housing, including said gripper arm, is positionable, at least vertically, to bring the gripper arm into position to perform a gripper operation, and including a mechanism which permits retraction of said gripper arm to protect said gripper arm when, during a downward vertical positioning of said housing, an obstacle is encountered by said gripper arm.

12. A mechanism as claimed in claim 11 wherein said mechanism which permits retraction includes a mechanism for frictionally maintaining a vertical position for said gripper arm, friction applied to said gripper arm by said mechanism being sufficiently low that the gripper arm may overcome the friction and move up relative to the housing when an obstacle is encountered.

13. A mechanism as claimed in claim 12 wherein said mechanism includes an element for selectively removing the friction from said gripper arm when the arm is in a raised position, permitting the gripper arm to return to its normal position relative to the housing, and for then restoring frictional engagement of the arm.

14. A mechanism as claimed in claim 11 including a detector which indicates the position of said gripper arm relative to said housing.

15. A mechanism as claimed in claim 1 wherein said housing, including said gripper arm, is positionable, at least vertically, to bring the gripper arm into position to perform a gripper operation, and including a mechanism which permits retraction of said gripper arm to protect said gripper arm when, during a downward vertical positioning of said housing, an obstacle is encountered by said gripper arm.

16. A mechanism as claimed in claim 15 wherein said mechanism which permits retraction includes a mechanism for frictionally maintaining a vertical position for said gripper arm, friction applied to said gripper arm by said mechanism being sufficiently low that the gripper arm may overcome the friction and move up relative to the housing when an obstacle is encountered.

17. A mechanism as claimed in claim 16 wherein said mechanism includes an element for selectively removing the friction from said gripper arm when the arm is in a raised position, permitting the gripper arm to return to its normal position relative to the housing, and for then restoring frictional engagement of the arm.

18. A mechanism as claimed in claim 15 including a detector which indicates the position of said gripper arm relative to said housing.

19. A robotic gripper mechanism including;

a housing;

a gripper arm extending from said housing;

a finger assembly mounted at a distal end of said arm and at least selectively adapted to engage an object to be gripped;

said housing, including said gripper arm and finger assembly, being positionable at least vertically, to bring the gripper arm into position to perform a gripper operation; and a mechanism which permits retraction of said gripper arm to protect said gripper arm when, during a downward vertical positioning of said housing, an obstacle is encountered by said gripper arm, said mechanism including a mechanism for frictionally maintaining a vertical position for said gripper arm, friction applied to said gripper arm by said mechanism being sufficiently low that the gripper arm may overcome the friction and move up relative to the housing when an obstacle is encountered.

20. A mechanism as claimed in claim 19 wherein said mechanism includes an element for selectively removing the friction from said gripper arm when the arm is in a raised position, permitting the gripper arm to return to its normal position relative to the housing, and for then restoring frictional engagement of the arm.

21. A mechanism as claimed in claim 19 including a detector for indicating the position of said gripper arm relative to said housing.

* * * * *